2,801,990
SYNTHETIC ELASTOMERIC ISOCYANATE MODIFIED POLYMERS AND METHOD FOR THEIR PREPARATION

Nelson V. Seeger, Cuyahoga Falls, and Thomas G. Mastin, Akron, Ohio, assignors, by mesne assignments, to The Goodyear Tire & Rubber Company, a corporation of Ohio No Drawing. Application November 12, 1952, Serial No. 320,128

6 Claims. (Cl. 260—75)

This invention relates to organic chemical compositions and to methods for their preparation. More particularly it relates to polymeric compounds and to their preparation. Still more particularly, it relates to synthetic elastomeric materials and to methods for their preparation. The particular class of organic compositions to which this invention relates are those resulting from the reaction of a polyisocyanate and an elastomeric diisocyanate-modified polyester or polyesteramide, containing a plurality of certain functional groups possessing reactive hydrogen.

The reactivity of the isocyanate radical with compounds containing reactive hydrogen is known. In certain chemical reactions where polyisocyanates are employed, the marked reactivity of the isocyanate radical results in certain difficulties. For example, trouble is encountered when the rate of reaction between the isocyanate radicals and the groups containing reactive hydrogen is so rapid that the final reaction product is formed before a useful article of commerce can be fabricated from that product. This is particularly true where a polyisocyanate is used to cure or cross-link diisocyanate-modified polyesters or polyesteramides such as those described in our co-pending applications Serial Numbers 187,696, filed September 29, 1950, now United States Patent 2,625,532; 305,914, filed August 22, 1952, now United States Patent 2,680,308; 307,900, filed September 4, 1952, now Patent 2,702,107; and 312,161, filed September 29, 1952, now United States Patent 2,625,535. If the isocyanate radicals react too rapidly, a cure of the uncured material is effected before the material can be processed through the manufacturing steps required to fabricate a useful article.

It is therefore an object of this invention to provide an improved method for the preparation of elastomeric polymeric materials formed from the reaction of polyisocyanates. Another object is to prepare such elastomeric polymeric materials using a method whereby the polyfunctional reactivity of the polyisocyanate can be controlled. A specific object is to provide new polymeric compounds of a rubber-like nature in which the rate of cure or cross-linking of the new compounds can be controlled. Other objects will become apparent as the description proceeds.

In its simplest form, the preparation of the polymeric materials from a polyisocyanate and the other reactant containing a plurality of groups having reactive hydrogen may be represented by the following equation:

(1)

$n(\text{OCN}-\text{R}-\text{NCO}) + n(\text{H}-\text{R}'-\text{H}) \longrightarrow$

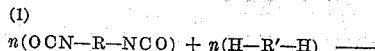
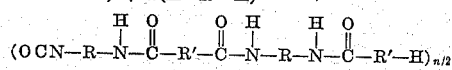

where R and R' are organic radicals. It is evident that both reactants must be bifunctional if linear polymeric materials are to be formed. If either or both reactants have more than two functional groups, a polymer results which is interlinked, i. e., both linearly-linked and cross-linked, and it is primarily this inter-linking reaction with which the present invention is concerned.

According to the practice of this invention, a method is provided whereby the reactivity of a plurality of —NCO groups may be controlled by the temperature of the reacting mixture. This method comprises first forming an adduct of the polyisocyanate by inactivating at least one but not all of the —NCO groups in the polyisocyanate by reaction with certain compounds containing reactive hydrogen. These adducts, once formed, will dissociate into their original components when subjected to the action of heat, with the result that the complete polyfunctional character of the polyisocyanate is restored. The formation of the mono-adducts, as some of these compounds can be called, may be represented by the following equation:

(2)

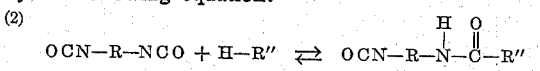

in which R and R'' are organic radicals.

It will be noted that the reaction between the polyisocyanate and the adduct-forming compound is a reversible one, the direction of which may be controlled by temperature and/or a catalyst. The mono-adduct is formed at relatively low temperatures while the formed adduct dissociates into the polyisocyanate and the adduct-forming compound at relatively high temperatures, for instance, in the range of from 100° C. to 150° C. In some instances a temperature as high as 200° C. or higher is necessary to effect the dissociation of the formed mono-adduct. It is this temperature control over the direction of the reaction which makes the adducts particularly useful as a means of controlling the rate of reaction between the adducts and the compound containing reactive hydrogen. When some of the isocyanate groups are "blocked" from reacting with the available hydrogen in the polymer-forming material, it is evident that the linear formation and cross-linking of the reactants is materially reduced. Upon the application of heat to the system, the blocked isocyanate groups are released, as represented by the reversible reaction shown in Equation 2, and may then react with the reactive hydrogen present in the polymer-forming material to form cross-linked polymers. The mono-adducts are also useful as a means for controlling the tendency of polyisocyanates to self-polymerize since the inactivation of one active —NCO group will retard such polymerization.

The overall reaction may be most simply represented by the following equation:

(3)

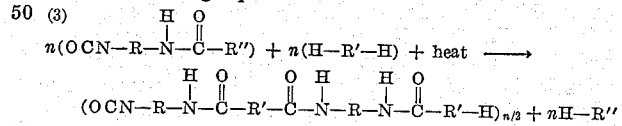

in which R, R', and R'' are organic radicals.

Although the reactions shown have been represented, for the sake of simplicity, as applied to a diisocyanate, a bifunctional reactant, and a mono-adduct of a diisocyanate, it is to be understood that this invention relates to polyisocyanates, polyfunctional reactants containing a plurality of reactive hydrogens, and poly-adducts of polyisocyanates as well. For instance, this invention embraces the use of a mono-adduct or a di-adduct of a triisocyanate, a mono-adduct, di-adduct, or tri-adduct of a tetraisocyanate, and similar adducts of other polyisocyanates. The invention is generically applicable to the use of polyisocyanate adducts in which at least one but not all of the isocyanate groups have been temporarily inactivated by reaction with an adduct-forming compound. The number of isocyanate groups which are "blocked" or inactivated by reaction with the adduct-forming compound may be controlled by the molecular proportions of polyisocyanate and adduct-forming compound used to form the adducts.

In the formation of the adducts, and subsequently the formation of the polymeric materials, as by reaction between the adduct and polymer-forming materials, any polyisocyanate may be used. Representative examples are the aliphatic compounds such as ethylene, trimethylene, tetramethylene, pentamethylene, hexamethylene, propylene-1,2; butylene-1,2; butylene-2,3; butylene-1,3; ethylidene and butylidene diisocyanates; the cycloalkylene compounds such as cyclopentylene-1,3; cyclohexylene-1,4; and cyclohexylene-1,2 diisocyanates; the aromatic compounds such as m-phenylene, p-phenylene, 4,4'-diphenyl, 1,5-naphthalene, and 1,4-naphthalene diisocyanates; the aliphatic-aromatic compounds such as 4,4'-diphenylene methane, 4,4'-tolidine, 1,4-xylylene and the tolylene diisocyanates such as 2,4-tolylene diisocyanate; the nuclear substituted aromatic compounds such as dianisidine diisocyanate, 4,4'-diphenyl ether diisocyanate and chloro-diphenylene diisocyanate; the triisocyanates such as 4,4',4''-triisocyanto triphenyl methane; 1,3,5-triisocyanto benzene; and 2,4,6-triisocyanto toluene; and the tetraisocyanates such as 4,4'-dimethyl-diphenyl methane 2,2',5,5'-tetraisocyanate.

The polyisocyanates which are particularly preferred in the preparation of the mono-adducts are 4,4'-diphenyl diisocyanate, 1,5-naphthalene diisocyanate, the meta tolylene diisocyanates such as 2,4-tolylene diisocyanate and 4,4'-diphenylene methane diisocyanate.

The adduct-forming compounds which are used to react with the polyisocyanate cannot be any compound containing hydrogen reactable with the —NCO group. Certain adducts formed are so stable that reversing the reaction by heat alone is not possible. It has been found that the adduct-forming compounds should be selected from the group comprising:

1. Tertiary alcohols such as tertiary butyl alcohol, tertiary amyl alcohol, dimethyl ethinyl carbinol, dimethyl phenyl carbinol, methyl diphenyl carbinol, triphenyl carbinol, 1-nitro tertiary butyl carbinol, 1-chloro tertiary butyl carbinol, and triphenyl silinol;

2. Secondary aromatic amines which contain only one group having a hydrogen reactive with an isocyanate group, such as the diaryl compounds which are preferred, including diphenyl amine, o-ditolyl amine, m-ditolyl amine, p-ditolyl amine, N-phenyl toluidine, N-phenyl xylidine, phenyl alpha naphthyl amine, phenyl beta naphthyl amine, carbazole, and the nuclear substituted aromatic compounds such as 2,2'-dinitro diphenyl amine and 2,2'-dichloro diphenyl amine;

3. Mercaptans such as 2-mercaptobenzothiazole, 2-mercapto thiazoline, dodecyl mercaptan, ethyl 2-mercapto thiazole, dimethyl 2-mercapto thiazole, beta naphthyl mercaptan, alpha naphthyl mercaptan, phenyl 2-mercapto thiazole, 2-mercapto 5-chloro-benzothiazole, methyl mercaptan, ethyl mercaptan, propyl mercaptan, butyl mercaptan, and ethinyl dimethyl thiocarbinol;

4. Lactams such as epsilon-caprolactam, delta-valerolactam, gamma-butyrolactam, and beta-propiolactam;

5. Imides such as carbimide, succinimide, phthalimide, naphthalimide, and glutarimide;

6. Monohydric phenols in which the hydroxyl group is the only group containing hydrogen reactive with the isocyanate group, such as phenol, the cresols, the xylenols, the trimethyl phenols, the ethyl phenols, the propyl phenols, the chloro phenols, the nitro phenols, the thymols, the carvacrols, mono alpha phenyl ethyl phenol, di alpha phenyl ethyl phenol, tri alpha phenyl ethyl phenol, and tertiary butyl phenol;

7. Compounds containing enolizable hydrogen such as aceto-acetic ester, diethyl malonate, ethyl n-butyl malonate, ethyl benzyl malonate, acetyl acetone, acetonyl acetone, benzimidazole, and 1-phenyl-3 methyl 5-pyrazolon.

The adduct-forming compounds should, of course, possess only one group containing a reactive hydrogen atom. The presence of more than one such group would permit polymerization reactions with the polyisocyanate, which are not desired.

The preferred adduct-forming compounds are diphenyl amine, phenyl beta naphthylamine, succinimide, phthalimide, tertiary butyl alcohol, tertiary amyl alcohol, dimethyl ethinyl carbinol, acetoacetic ester, diethyl malonate, mono alpha-phenyl ethyl phenol, epsilon-caprolactam, and 2-mercaptobenzothiazole.

The adducts formed by reacting a polyisocyanate with a compound from the groups listed above will, it has been found, dissociate into the original components upon application of heat to the system, so that such adducts may be mixed with reactants having a plurality of groups containing reactive hydrogen with the result that there is a reduction in the rate of reaction forming the polymeric materials (as represented by Equation 1) until the mixture is subjected to heat (as illustrated by Equation 3).

In the preparation of the mono-adducts in general, the polyisocyanate and the adduct-forming compound are usually dissolved in a suitable inert solvent such as toluene, methyl ethyl ketone, or o-dichlorobenzene. The solutions are stirred together and permitted to stand. The reaction should be caused to take place at a temperature below the decomposition temperature of the desired product and preferably at a temperature not exceeding approximately 100° C. In most instances the reaction will proceed satisfactorily at room temperature. The adduct formed separates from the solution and is removed therefrom by filtering or evaporation of the solvent. The time required for the adduct to form will vary from a few minutes to several hours depending upon the particular reactants used. If a mono-adduct of a polyisocyanate is desired, usually an excess of the polyisocyanate is provided so that the product which separates will be substantially pure mono-adduct. The precipitated product will probably contain small amounts of unreacted material which, if necessary, can be removed by recrystallization or extraction procedures known to those skilled in the art.

The preparation of the adducts is illustrated by the following examples which are to be interpreted as representative rather than restrictive of the scope of this invention.

EXAMPLE 1

4,4'-diphenyl diisocyanate (0.15 mol) and tertiary amyl alcohol (0.10 mol) were dissolved in 400 cubic centimeters of dry toluene. The solution was refluxed for 5 hours. The mono-adduct began to separate from solution during the first hour. The solution was cooled, and the mono-adduct removed by filtration. After resuspension and digestion in petroleum ether and filtration of the solution, the mono-adduct was air dried at room temperature. A yield of 29% was obtained.

EXAMPLE 2

4,4'-diphenyl diisocyanate (47.2 grams or 0.20 mol) and epsilon caprolactam (11.3 grams or 0.10 mol) were dissolved in 400 cubic centimeters of toluene. Separation of the mono-adduct started within one minute after the materials were dissolved. The white, solid product was separated from the solution by filtering and found to contain 22.3 grams of the mono-adduct.

EXAMPLE 3

4,4'-diphenyl diisocyanate (35.4 grams or 0.15 mol) and aceto-acetic ester (13.01 grams or 0.10 mol) were dissolved in 390 grams of toluene, to which 1 gram of freshly prepared sodium methylate was added. After 16 hours at reflux temperatures, the mono-adduct which had formed and separated from solution was filtered off.

EXAMPLE 4

4,4'-diphenyl diisocyanate (35.4 grams or 0.15 mol) and diethyl malonate (16.02 grams or 0.10 mol) were dissolved in 390 grams of toluene, to which 1 gram of freshly prepared sodium methylate was added. After sixteen hours at reflux temperature, the mono-adduct which had formed and separated from solution, was filtered off.

EXAMPLE 5

4,4'-diphenyl diisocyanate (35.4 grams or 0.15 mol) was dissolved in 390 grams of toluene by heating. The solution was filtered to remove any undissolved solids. To this solution was added 0.10 mol of phenyl beta naphthyl amine with stirring. The mono-adduct separated from solution. The product was removed from solution by filtering, leaving the unreacted material in solution. The yield of this first-crop separation was 8.7 grams of the mono-adduct.

EXAMPLE 6

4,4'-diphenyl diisocyanate (35.4 grams or 0.15 mol) was dissolved in 390 grams of toluene by heating. The solution was filtered to remove any undissolved solids. To this solution was added 0.10 mol of diphenyl amine with stirring. The mono-adduct separated from solution and was removed by filtering, leaving the unreacted material in solution. The yield of this first-crop separation was 8.7 grams of the mono-adduct.

EXAMPLE 7

4,4'-diphenyl diisocyanate (0.15 mol) and phthalimide (0.10 mol) were dissolved in 440 cubic centimeters of methyl ethyl ketone. A white solid separated from solution. The solution was filtered, and a yield of 29.2 grams of mono-adduct was obtained.

EXAMPLE 8

4,4'-diphenyl diisocyanate (35.4 grams or 0.15 mol) and succinimide (9.91 grams or 0.10 mol) were dissolved in 440 cubic centimeters of methyl ethyl ketone. A white solid separated from solution which was filtered. A yield of 24.7 grams of the mono-adduct was obtained.

EXAMPLE 9

Mercaptobenzothiazole (83.5 grams) was dissolved in 600 cubic centimeters of methyl ethyl ketone, and 4,4'-diphenyl diisocyanate (177 grams) was dissolved in one liter of methyl ethyl ketone. The solutions were poured together and an additional 400 cubic centimeters of methyl ethyl ketone was added. A light tan solid material separated from solution, was removed by filtering, and dried. The yield of the first and second-crop separation was 100 grams of the mono-adduct.

EXAMPLE 10

4,4'-diphenyl diisocyanate (23.6 grams or 0.10 mol) and mono alpha phenyl ethyl phenol (19.83 grams or 0.10 mol) were dissolved in 390 grams of toluene. After standing for several hours, the solution was evaporated to remove the toluene. An oily liquid remained which solidified on standing. The formed mono-adduct showed a melting point of 81–86° C.

The procedure set forth in the foregoing examples for the preparation of mono-adducts of diisocyanates may also be employed in the production of polyadducts of polyisocyanates. Any of the adduct-forming materials set forth above may be reacted with any of the mentioned polyisocyanates in accordance with the procedures described in the foregoing examples to obtain adducts of the desired type.

The theory behind the use of the adducts of polyisocyanates in order to control the polyfunctional reactivity of the plurality of —NCO groups present may be illustrated, for instance, by the mono-adduct of a triisocyanate. In such a compound, while two —NCO groups remain available for reaction, the overall trifunctional reactivity of the three —NCO groups in the original triisocyanate has been reduced theoretically by one third.

Such reduction in activity is desirable as a means of controlling the reactivity of polyisocyanates. It is likewise to be noted that there is no particular advantage in employing, in such a reaction, a polyisocyanate all of whose —NCO groups have been "blocked," since reaction of a polymeric nature is prevented even though one free —NCO group is present in the reacting mixture. This invention therefore applies to those adducts of polyisocyanates in which at least one —NCO group is inactivated or "blocked" (subject to being reactivated or "unblocked" by applying heat) and in which there is at least one active —NCO group.

The adducts of polyisocyanates are particularly useful as curing or cross-linking agents for the diisocyanate-modified polyesters and polyesteramides; the polyesteramide - urea - urethanes, polyester-amide-urethane-urethanes, polyester-amide-amide-urethanes and other similar materials. As described in our co-pending applications referred to above, these materials are synthetic polymeric elastomers possessing outstanding physical properties and will be referred to hereinafter and in the appended claim as elastomeric diisocyanate-modified polyesters.

While each of these materials will be discussed at length below, the general chemical reactions involved in their preparation, may be represented by the following illustrations in which R, R', and R" denote divalent organic radicals.

*Preparation of polyester*

(4)
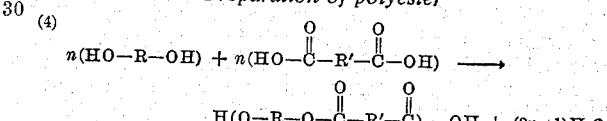

in which $n$ is a positive whole number denoting the degree of polymerization of the polyester formed.

*Preparation of polyesteramide*

(5)
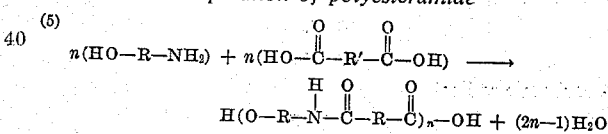

*Preparation of diisocyanate-modified polyester*

(6)
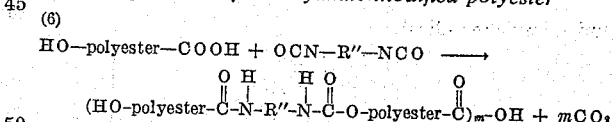

in which $m$ is a positive whole number denoting the number of segments in the diisocyaante-modified, chain-extended polymer.

*Preparation of diisocyanate-modified polyesteramide*

(7)
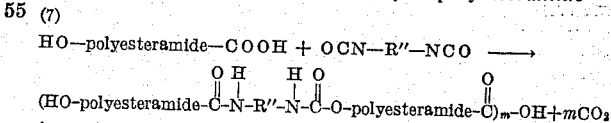

in which $m$ is a positive whole number denoting the number of segments in the diisocyanate-modified, chain-extended polymer.

*Preparation of diisocyanate-modified interpolymers*

(8)
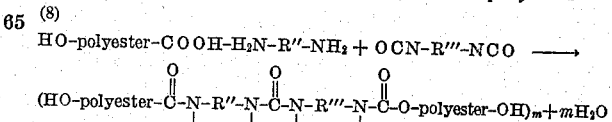

(9)
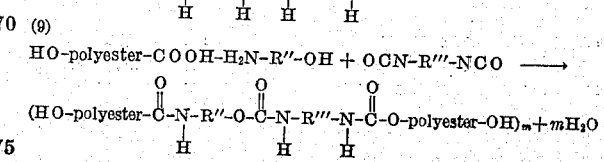

(10)

HO—polyester—COOH + H₂N—R″—COOH + OCN—R‴—NCO ⟶

(HO—polyester—C(=O)—N(H)—R″—C(=O)—N(H)—R‴—N(H)—C(=O)—O—polyester—OH)ₘ + mH₂O + mCO₂ in which R″ and R‴ represent divalent organic radicals and m represents a positive whole number denoting the number of segments in the modified chain-extended interpolymer.

Equations 6, 7, 8, 9 and 10 represent the reactions which may take place in forming the uncured elastomeric polymers according to the limitations as to acid number, hydroxyl number, amino groups, bifunctional additives, and amount of particular diisocyanate used in their preparation, described in our co-pending applications Serial Numbers 187,696, filed September 29, 1950, now U. S. Patent 2,625,532; 305,914, filed August 22, 1952, now U. S. Patent 2,680,308; 307,900, filed September 4, 1952, now U. S. Patent 2,702,107; and 312,161, filed September 29, 1952, now U. S. Patent 2,625,535.

The mono-adducts of diisocyanates may be conveniently used in the preparation of these uncured polymers, but it is in the addition of the curing or cross-linking polyisocyanate that the use of the adducts performs a particularly valuable function.

The curing or cross-linking of the uncured polymers takes place as the result of reaction between the —NCO groups in the polyisocyanate and the reactive hydrogens in certain groups present in the chain of the extended polymer and certain terminal groups at the ends of the chain extended units. The terminal groups include, of course, hydroxyl, carboxyl, and amino radicals. The groups along the chain include the groups formed by reaction between an —NCO group and a carboxyl, hydroxyl, or amino group, and may be represented as a substituted amide linkage

a carbamic radical

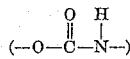
and a ureylene radical

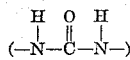

respectively. Each of these groupings has at least one active hydrogen available for reaction with the —NCO group of the polyisocyanate.

It is necessary in the fabricating of articles from a rubber or rubber-like material to be able to process the material after the particular chemical which will ultimately cause its transformation from the uncured to the cured state has been added to the uncured elastomeric diisocyanate-modified polyester. The time required to effect such processing is often a matter of several days or even weeks. It is obvious that if the material cures before the processing is complete, subsequent processing or forming is impossible. The use of the adducts of polyisocyanates as curing agents for the elastomeric polymers described will minimize the cross-linking or curing of the polymers during the fabricating of the material. When the material has been fabricated into its desired form, curing is effected by the application of heat and pressure in accordance with normal practice. The heat causes the breakdown of the adduct with resultant freeing of the "blocked" or inactivated —NCO groups, which groups will then react with the reactive hydrogen atoms available in the various linkages along the chain-extended polymer to effect a cross-linking or cure of the material.

The particular diisocyanate-modified elastomeric polymers which can be cured by reaction with the adducts of polyisocyanates described herein have been set forth at length in our co-pending applications referred to above. They may be grouped in four general classes.

First, the reaction product of (1) a polyester or polyesteramide prepared from at least one dibasic carboxylic acid and at least one glycol, and/or at least one amino alcohol, and/or at least one diamine; the number of hydrogen-bearing amino groups being present in an amount not to exceed 7.5% of the total hydroxyl and hydrogen-bearing amino groups present, the polyester or polyesteramide having a hydroxyl number from 40 to 100 (the preferred range is from 50 to 60) and an acid number from 0 to 7; and (2) at least one diisocyanate selected from the group consisting of 4,4′-diphenyl diisocyanate, 4,4′-diphenylene methane diisocyanate, dianisidine diisocyanate, 4,4′-tolidine diisocyanate, 1,5-naphthalene diisocyanate, 4,4′-diphenyl ether diisocyanate, and p-phenylene diisocyaante, the diisocyanate being used in an amount ranging from 0.70 to 0.99 (the preferred range is from 0.90 to 0.99) mol per mol of polyester or polyesteramide.

Second, the reaction product of (1) a polyester or polyesteramide prepared from at least one dibasic carboxylic acid, and at least one glycol and/or at least one amino alcohol and/or at least one diamine, the number of hydrogen-bearing amino groups present being in an amount not to exceed 30% of the total hydroxyl and hydrogen-bearing amino groups present, the polyester or polyesteramide having a hydroxyl number from 30 to 140 (the preferred range is from 50 to 60) and an acid number from 9 to 12; and (2) at least one tolylene diisocyanate, the diisocyanate being used in an amount ranging from 0.85 to 1.10 (the preferred range is from 0.90 to 1.00) mols per mol of polyester or polyesteramide.

Third, the reaction product resulting from the reaction of a mixture comprising (1) a polyester prepared from bifunctional ingredients including at least one dibasic carboxylic acid containing at least three carbon atoms, and at least one glycol, said polyester having a hydroxyl number from 30 to 140 (the preferred range is from 50 to 60) and an acid number from 0 to 12; (2) at least one bifunctional additive selected from the group consisting of diamines, amino alcohols, dicarboxylic acids, hydroxy carboxylic acids, amino carboxylic acids and the ureas, guanidines, and thioureas containing a primary amino group, said bifunctional additive being used in an amount such that the total number of —NH₂ and —COOH equivalents present in said bifunctional reactant shall be from 0.06 to 0.24 equivalents per mol of polyester, and (3) at least one tolylene diisocyanate, the diisocyanate being used in an amount equal to the sum of from 0.85 mol to 1.10 (the preferred range is from 0.90 to 1.00) mols of diisocyanate per mol of polyester and the molar amount of diisocyanate equivalent to the mols of said bifunctional additive used.

Fourth, the reaction product resulting from the reaction of a mixture comprising (1) a polyester prepared from bifunctional ingredients including at least one dibasic carboxylic acid containing at least three carbon atoms and at least one glycol, said polyester having a hydroxyl number between 40 and 100 (the preferred range is from 50 to 60) and an acid number from 0 to 7; (2) at least one bifunctional additive selected from the group consisting of diamines, amino alcohols, dicarboxylic acids, hydroxy carboxylic acids, amino carboxylic acids and the ureas, guanidines, and thioureas containing a primary amino group, said bifunctional additive being used in an amount such that the total number of —NH₂ and —COOH equivalents present in said bifunctional reactant shall be from 0.06 to 0.48 equivalents per mol of polyester, and (3) at least one diisocyanate selected from the group consisting of 4,4'-diphenyl diisocyanate, 4,4'-diphenylene methane diisocyanate, 4,4'-tolidine diisocyanate, dianisidine diisocyanate, 1,5-naphthalene diisocyanate, 4,4'-diphenyl ether diisocyanate, and p-phenylene diisocyanate, the diisocyanate being used in an amount equal to the sum of from 0.70 mol to 0.99 (the preferred range is from 0.90 to 0.99) mol of diisocyanate per mol of polyester and the molar amount of diisocyanate equivalent to the mols of bifunctional additive used.

Listed below are the reactants used to form some preferred polyesters and polyesteramides which, when prepared and subsequently modified by a diisocyanate or other additive in accordance with the appropriate limitations indicated in the description of the four types of synthetic elastomers, will produce elastomeric products.

1. Ethylene glycols plus adipic acid.
2. Propylene glycol 1,2 plus adipic acid.
3. Ethylene glycol (80 mol percent), propylene glycol 1,2 (20 mol percent) plus adipic acid.
4. Ethylene glycol (80 mol percent), propylene glycol 1,2 (20 mol percent) plus azelaic acid.
5. Ethylene glycol (80 mol percent), propylene glycol 1,2 (20 mol percent) plus sebacic acid.
6. Ethylene glycol (80 mol percent), propylene glycol 1,2 (20 mol percent) plus dilinoleic acid (20 mol percent), adipic acid (80 mol percent).
7. Ethylene glycol (80 mol percent), glycerine monoethyl ether (20 mol percent) plus adipic acid.
8. Ethylene glycol (80 mol percent), butylene glycol 1,4 (20 mol percent) plus adipic acid.
9. Ethylene glycol (80 mol percent), propylene glycol 1,3 (20 mol percent) plus adipic acid.
10. Ethylene glycol (80 mol percent), pentane diol 1,5 (20 mol percent) plus adipic acid.
11. Ethylene glycol (80 mol percent), glycerine monoisopropyl ether (20 mol percent) plus adipic acid.
12. Ethylene glycol (80 mol percent), propylene glycol 1,2 (from 18 to 5 mol percent), ethanol amine (from 2 to 15 mol percent), plus adipic acid.
13. Ethylene glycol (80 mol percent), propylene glycol 1,2 (20 mol percent) plus maleic acid (from 3 to 6 mol percent), adipic acid (from 97 to 94 mol percent).
14. Ethylene glycol (80 mol percent), propylene glycol 1,2 (from 19 to 17 mol percent), piperazine (from 1 to 3 mol percent) plus adipic acid.
15. Ethylene glycol (80 mol percent), propylene glycol 1,2 (from 18 to 5 mol percent), dihydroxyethyl analine (from 2 to 15 mol percent) plus adipic acid.
16. Ethylene glycol (80 mol percent), diethylene glycol (20 mol percent) plus adipic acid.
17. Ethylene glycol (from 90 to 10 mol percent), propylene glycol 1,2 (from 10 to 90 mol percent) plus adipic acid.
18. Ethylene glycol (from 90 to 10 mol percent), propylene glycol 1,2 (from 10 to 90 mol percent) plus azelaic acid.

The diisocyanates which are preferred when used to form the unvulcanized modified polyesters and polyesteramides, are 4,4'-diphenyl diisocyanate, 1,5-naphthalene diisocyanate, the meta tolylene diisocyanates, such as 2,4- and 2,6-tolylene diisocyanate, and 4,4'-diphenylene methane diisocyanate. If meta tolylene diisocyanate is to be used, a convenient method of adding it is in the form of one of its dimers such as the dimer of 2,4-tolylene diisocyanate of the following formula:

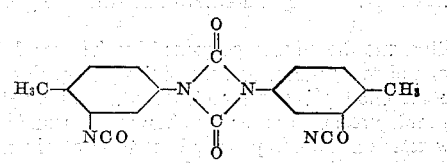

The dimer is less toxic than the monomeric material.

Of the first class of elastomeric polymers described above, those of particular interest are the rubber-like polymers resulting from polyethylene adipate modified by 4,4'-diphenyl diisocyanate, 1,5-naphthalene diisocyanate, 4,4'-diphenylene methane diisocyanate, or mixtures thereof; polypropylene 1,2 adipate modified by 4,4'-diphenyl diisocyanate, 1,5-naphthalene diisocyanate, 4,4'-diphenylene methane diisocyanate, or mixtures thereof; polyethylene (80 mol percent) propylene 1,2 (20 mol percent) adipate modified by 4,4'-diphenyl diisocyanate, 1,5-naphthalene diisocyanate, 4,4'-diphenyl methane diisocyanate, or mixtures thereof; polyethylene (80 mol percent) propylene 1,2 (20 mol percent) azelate modified by 4,4'-diphenyl diisocyanate, 1,5-naphthalene diisocyanate, 4,4'-diphenylene methane diisocyanate, or mixtures thereof; and polyethylene (80 mol percent) propylene 1,2 (from 19 to 17 mol percent) piperazine (from 1 to 3 mol percent) adipate modified by 4,4'-diphenyl diisocyanate, 1,5-naphthalene diisocyanate, 4,4'-diphenylene methane diisocyanate, or mixtures thereof. These polymers, when cured, have been found to possess outstanding physical properties.

Of the second class of elastomeric polymers described above, those of particular interest are the rubber-like polymers resulting from polyethylene adipate modified by a meta tolylene diisocyanate, polypropylene 1,2 adipate modified by a meta tolylene diisocyanate, polyethylene (80 mol percent) propylene 1,2 (20 mol percent) adipate modified by a meta tolylene diisocyanate, polyethylene (80 mol percent) propylene 1,2 (20 mol percent) azelate modified by a meta tolylene diisocyanate, and polyethylene (80 mol percent) propylene 1,2 (from 19 to 17 mol percent) piperazine (from 1 to 3 mol percent) adipate modified by a meta tolylene diisocyanate.

Mixtures of meta tolylene diisocyanates such as mixtures of 2,4- and 2,6-tolylene diisocyanates may also be used.

Of the third class of elastomeric interpolymers described above, those of particular interest are the rubber-like materials resulting from (1) Polyethylene adipate modified by a meta tolylene diisocyanate, and by ethylene diamine, tetramethylene diamine, hexamethylene diamine, ethanol amine, benzidine, 4,4'-diamino diphenyl methane or mixtures thereof.

(2) Polypropylene 1,2-adipate modified by a meta tolylene diisocyanate, and by ethylene diamine, tetramethylene diamine, hexamethylene diamine, ethanol amine, benzidine, 4,4'-diamino diphenyl methane or mixtures thereof.

(3) Polyethylene (80 mol percent) propylene 1,2 (20 mol percent) adipate modified by a meta tolylene diisocyanate, and by ethylene diamine, tetramethylene diamine, hexamethylene diamine, ethanol amine, benzidine, 4,4'-diamino diphenyl methane or mixtures thereof.

(4) Polyethylene (80 mol percent) propylene 1,2 (20 mol percent) azelate modified by a meta tolylene diisocyanate, and by the ethylene diamine, tetramethylene diamine, hexamethylene diamine, ethanol amine, benzidine, 4,4'-diamino diphenyl methane or mixtures thereof.

Mixtures of meta tolylene diisocyanates such as mixtures of 2,4- and 2,6-tolylene diisocyanates may also be used.

Of the fourth class of elastomeric interpolymers described above, those of particular interest are the rubber-like materials resulting from (1) Polyethylene adipate modified by 4,4'-diphenyl diisocyanate, 1,5-naphthalene diisocyanate, 4,4'-diphenylene methane diisocyanate, or mixtures thereof, and by ethylene diamine, tetramethylene diamine, hexamethylene diamine, ethanol amine, benzidine, 4,4'-diamino diphenyl methane or mixtures thereof.

(2) Polypropylene 1,2 adipate modified by 4,4'-diphenyl diisocyanate, 1,5-naphthalene diisocyanate, 4,4'-diphenylene methane diisocyanate, or mixtures thereof, and by ethylene diamine, tetramethylene diamine, hexamethylene diamine, ethanol amine, benzidine, 4,4'-diamino diphenyl methane or mixtures thereof.

(3) Polyethylene (80 mol percent) propylene 1,2 (20 mol percent) adipate modified by 4,4'-diphenyl diisocyanate, 1,5-naphthalene diisocyanate, 4,4'-diphenylene methane diisocyanate, or mixtures thereof, and by ethylene diamine, tetramethylene diamine, hexamethylene diamine, ethanol amine, benzidine, 4,4'-diamino diphenyl methane or mixtures thereof.

(4) Polyethylene (80 mol percent) propylene 1,2 (20 mol percent) azelate modified by 4,4'-diphenyl diisocyanate, 1,5-naphthalene diisocyanate, 4,4-diphenylene methane diisocyanate, or mixtures thereof, and by ethylene diamine, tetramethylene diamine, hexamethylene diamine, ethanol amine, benzidine, 4,4'-diamino diphenyl methane or mixtures thereof.

The amount of polyisocyanate adduct required to cure or cross-link the chain-extended polymers and interpolymers described above must be held within certain limits. Any adduct of an organic diisocyanate, polyisocyanate or mixtures of adducts of diisocyanates, polyisocyanates, or both, may be added in this step. When curing the polymers of the first and second classes, enough adduct must be added to the polymer so that the total amount of —NCO equivalents (whether active or inactive and including that added in the formation of the polymer) shall be from 2.80 to 3.20 equivalents per mol of polyester or polyesteramide. In addition to this, an amount of adduct equivalent to twice the molar amount of bifunctional additive used in preparing the interpolymer must be employed in the curing of the interpolymers of the third and fourth classes. Smaller amounts of polyisocyanate adducts added to cure the polymer or interpolymer will result in an under-cured product. The use of greater amounts is a waste of material with no improved properties in the cured product and in some cases produces a cured material having properties more resinous than rubber-like. If a triisocyanate adduct or tetraisocyanate adduct is used in place of a diisocyanate adduct to effect a cure, not as much material, on a mol basis, need be used, since the curing or cross-linking of the linear molecules depends upon the number of —NCO groups present in the curing agent. For example, if 0.50 mol of a diisocyanate adduct gives a satisfactory cure of a diisocyanate-modified polyester or polyesteramide, the use of approximately 0.25 mol of a tetraisocyanate adduct will result in a similar state of cure.

The actual curing of the polymer or interpolymer is accomplished by methods familiar to those skilled in the art. The time and temperature required to effect the best cure for any particular polymer or interpolymer will of course vary as is the case with the curing of conventional natural rubber compounds. The cure for best results should be accomplished by the use of dry heat since exposure of the polymer to hot water or steam results in a partial degeneration of the cured material.

The following examples, in which parts are by weight, illustrate preparation of a polyester, a diisocyanate-modified polyester, and the curing of the modified polyesters using the polyisocyanate adducts according to the teachings of this invention.

EXAMPLE 11

Preparation of a typical polyester

Adipic acid (3515 parts) was placed in a 5 liter, 3-necked flask fitted with a stirrer, thermo-couple well, gas inlet tube, distilling head, and condenser. To the acid were added 1064 parts of ethylene glycol and 869 parts of propylene 1,2 glycol. The molar ratio of dibasic acid to glycol is 1:1.19. The mixture was heated to 130–160° C. until most of the water had distilled off. The temperature was then gradually raised to 200° C., the pressure being gradually reduced to 20 mm. and nitrogen being bubbled through the melt. After 23½ hours a soft white waxy solid was obtained. Determinations showed the acid number to be 3.5 and the hydroxyl number to be 58.6.

EXAMPLE 12

Preparation of the diisocyanate-modified polymer

A quantity of polyester was prepared from adipic acid, ethylene glycol, and propylene 1,2 glycol according to the general method and in substantially the same ratios as shown in Example 11. This polyester had an acid number of 3.1 and a hydroxyl number of 55.6. After heating 2270 parts of this polyester in a steam-heated Baker Perkins mixer to 120° C., 4,4'-diphenyl-diisocyanate (280.3 parts of 95.7% purity or 0.96 mol per mol of polyester) was added. After ten minutes of mixing, the hot melt was poured into a carnauba wax coated tray and baked for 8 hours at 130° C. The resulting polymer had excellent processing characteristics on a rubber mill. Tests showed the following physical properties—intrinsic viscosity 1.69, percent gel 3.9, and softening point 186° C.

EXAMPLE 13

A rubber-like polymer (100 parts) prepared according to the procedure outlined by Example 12, was mixed with 8.19 parts of the mono-adduct of epsilon-caprolactam and 4,4'-diphenyl diisocyanate on a rubber mill. (See Example 2.) The test sheets prepared from the polymer were heated for twenty-six hours at 248° F. in an oven. The sheets were then press-cured for 35 minutes at 300° F. Test results showed the cured material to have a tensile strength of 4050 pounds per square inch, an elongation of 925% and a hardness (Shore Type A) of 55.

EXAMPLE 14

A rubber-like polymer (100 parts) prepared according to the procedure outlined by Example 12 was mixed with 9.45 parts of the mono-adduct prepared from 4,4'-diphenyl diisocyanate and 2-mercaptobenzothiazole. (See Example 9.) Test sheets were press-cured for 70 minutes at 300° F. Test results showed the cured material to have a tensile strength of 2400 pounds per square inch, an elongation of 860% and a hardness (Shore Type A) of 56.

EXAMPLE 15

A rubber-like polymer (100 parts) prepared according to the procedure outlined by Example 12 was mixed with 8.48 parts of the mono-adduct prepared from 4,4'-diphenyl diisocyanate and succinimide. (See Example 8.) Test sheets were press-cured for 70 minutes at 300° F. Test results showed the cured material to have a tensile strength of 2700 pounds per square inch, an elongation of 925% and a hardness (Shore Type A) of 55.

EXAMPLE 16

A rubber-like polymer (100 parts) prepared according to the procedure outlined by Example 12, except that 1,5-naphthalene diisocyanate was used as a molar replacement for 4,4'-diphenyl diisocyanate, was mixed with 12.2 parts of the mono-adduct prepared from 1,5-naphthalene diisocyanate and diethyl malonate. The mix was heated for two hours at 300° F. and then press-cured for one hour at 300° F. Test results showed the cured material to have a tensile strength of 2660 pounds per square inch, an elongation of 820% and a hardness (Shore Type A) of 51.

To illustrate the advantage gained by the use of the adducts of polyisocyanates as cross-linking or curing agents for the modified polyesters and polyesteramides, the following table presents the results obtained by running plastic flow tests on the compounded material at given intervals after the curing agent had been added to the elastomeric polymer. The figures shown in the table represent the number of seconds required to extrude 1 inch of the compound through an orifice at a temperature of 300° F. and under a pressure of 500 pounds per square inch. The samples tested were aged at room temperature for the length of time indicated. The control represents a polymer prepared according to the procedure outlined by Example 12 to which was added approximately 0.55 mol of free or unblocked 4,4'-diphenyl diisocyanate per mol of polyester.

|  | Original | After 2 days | After 5 days |
|---|---|---|---|
| Control | 333 | 667 | 3,000 |
| Example 13 | 114 | 158 | 121 |
| Example 14 | 179 |  | 223 |
| Example 15 | 191 |  | 171 |

It is evident from these tests that the control sample, using 4,4'-diphenyl diisocyanate, has been substantially cured or cross-linked after 5 days' aging at room temperature while the other samples, containing the monoadducts of 4,4'-diphenyl diisocyanate, remain processible. The samples prepared using the adducts can, after 5 days' aging, still be worked or processed through the various fabricating operations necessary to produce a finished product, while the control, after the same period of time, has cured to a point where it is no longer processible nor useable in fabricating a finished product.

The elastomeric polymers and interpolymers prepared according to the practices of this invention are, in general, useful in those applications where natural rubber or rubber-like materials are used. In particular they may be used in tires, belts, hose, sheet packing, gaskets, molded goods, floor mats, dipped goods, sheeting, tank lining, soles, heels, covered rolls, and other mechanical and industrial goods.

This application is a continuation-in-part of our co-pending application Serial No. 193,518, filed November 1, 1950, now abandoned.

While certain representative embodiments and details have been shown for the purpose of illustrating the invention, it will be apparent to those skilled in this art that various changes and modifications may be made therein without departing from the spirit or scope of the invention.

We claim:

1. A process which comprises forming a mixture of (1) the reaction product of a polyisocyanate and another compound selected from the group consisting of tertiary alcohols, secondary aromatic amines, mercaptans, lactams, monohydric phenols, imides, and compounds containing enolizable hydrogen, said reaction product containing at least one active —NCO group and at least one inactivated —NCO group, and (2) an elastomeric diisocyanate-modified linear polymer and heating said mixture to release the inactivated —NCO groups present in said reaction product and to effect a cure of said elastomeric diisocyanate-modified linear polymer, said elastomeric diisocyanate-modified linear polymer being selected from the group consisting of: (A) the product resulting from the reaction of a mixture comprising (3) a material prepared from bifunctional ingredients including at least one dibasic carboxylic acid and at least one complementary bifunctional reactant in which the functional groups are selected from the class consisting of the hydroxyl group and the hydrogen-bearing amino groups, the hydrogen-bearing amino groups being present in an amount not to exceed 7.5% of the total functional groups of said complementary bifunctional reactant, said material having a hydroxyl number from 40 to 100 and an acid number from 0 to 7, and (4) at least one diisocyanate selected from the group consisting of 4,4'-diphenyl diisocyanate; 4,4'-diphenylene methane diisocyanate; dianisidine diisocyanate; 4,4'-tolidine diisocyanate; 1,5-naphthalene diisocyanate; 4,4'-diphenyl ether diisocyanate, and p-phenylene diisocyanate, the diisocyanate being used in an amount ranging from 0.70 to 0.99 mol per mol of said material; (B) the product resulting from the reaction of a mixture comprising (5) a material prepared from bifunctional ingredients including at least one dibasic carboxylic acid and at least one complementary bifunctional reactant in which the functional groups are selected from the class consisting of the hydroxyl group and the hydrogen-bearing amino groups, the hydrogen-bearing groups being present in an amount not to exceed 30% of the total functional groups of said complementary bifunctional reactant, said material having a hydroxyl number from 30 to 140 and an acid number from 0 to 12, and (6) at least one tolylene diisocyanate used in an amount ranging from 0.85 to 1.10 mols per mol of said material; (C) the product resulting from the reaction of a mixture comprising (7) a polyester prepared from bifunctional ingredients including at least one dibasic carboxylic acid containing at least three carbon atoms, and at least one glycol, said polyester having an hydroxyl number from 30 to 140 and an acid number from 0 to 12; (8) at least one bifunctional additive selected from the group consisting of diamines, amino alcohols, dicarboxylic acids, amino carboxylic acids, hydroxy carboxylic acids and the ureas, guanidines, and thioureas containing a primary amino group, said bifunctional additive being used in an amount such that the total number of —NH2 and —COOH equivalents present in said bifunctional reactant shall be from 0.06 to 0.24 equivalents per mol of polyester, and (9) at least one tolylene diisocyanate used in an amount equal to the sum of from 0.85 mols to 1.10 mols of diisocyanate per mol of polyester plus the molar amount of diisocyanate equivalent to the mols of said bifunctional additive used; (D) the product resulting from the reaction of a mixture comprising (10) a polyester prepared from bifunctional ingredients including at least one dibasic carboxylic acid containing at least three carbon atoms and at least one glycol, said polyester having a hydroxyl number between 40 and 100 and an acid number from 0 to 7, (11) at least one bifunctional additive selected from the group consisting of diamines, amino alcohol, dicarboxylic acids, amino carboxylic acids, hydroxy carboxylic acids and the ureas, guanidines and thioureas containing a primary amino group, said bifunctional additive being used in an amount such that the total number of —NH2 and —COOH equivalents present in said bifunctional reactant shall be from 0.06 to 0.48 equivalents per mol of polyester, and (12) at least one diisocyanate selected from the group consisting of 4,4'-diphenyl diisocyanate; 4,4'-diphenylene methane diisocyanate; 4,4'-tolidine diisocyanate; dianisidine diisocyanate; 1,5-naphthalene diisocyanate; 4,4'-diphenyl ether diisocyanate, and p-phenylene diisocyanate, the diisocyanate being used in an amount equal to the sum of from 0.70 mol to 0.99 mol of diisocyanate per mol of polyester plus the molar amount of diisocyanate equivalent to the mols of bifunctional additive used, (A) and (B) being mixed with a sufficient amount of said reaction product to bring the total number of —NCO equivalents and inactivated —NCO equivalents present to from 2.80 to 3.20 equivalents per mol of said material and (C) and (D) being mixed with a sufficient amount of said reaction product to bring the total number of —NCO equivalents and inactivated —NCO equivalents present to the sum of from 2.80 to 3.20 equivalents per mol of said polyester plus twice the molar amount of bifunctional additive used in the preparation of said elastomeric diisocyanate-modified linear polymer.

2. The process defined by claim 1 in which the elastomeric diisocyanate-modified linear polymer results from the reaction of a mixture comprising (A) a polyester prepared from at least one dibasic carboxylic acid and at least one glycol, said polyester having a hydroxyl number from 40 to 100 and an acid number from 0 to 7 and (B) 4,4'-diphenyl diisocyanate used in an amount ranging from 0.90 to 0.99 mol per mol of said polyester.

3. The process defined by claim 1 in which the elastomeric diisocyanate-modified linear polymer results from the reaction of a mixture comprising (A) a polyester prepared from at least one dibasic carboxylic acid and at least one glycol, said polyester having a hydroxyl number from 30 to 140 and an acid number from 0 to 12 and (B) tolylene diisocyanate used in an amount ranging from 0.90 to 1.00 mol per mol of said polyester.

4. The process defined by claim 1 in which the elastomeric diisocyanate-modified linear polymer results from the reaction of a mixture comprising (A) a polyester prepared from at least one dibasic carboxylic acid containing at least three carbon atoms and at least one glycol, said polyester having a hydroxyl number from 30 to 140 and an acid number from 0 to 12, (B) a diamine used in an amount such that the total number of —$NH_2$ equivalents is from 0.06 to 0.24 equivalents per mol of polyester and (C) tolylene diisocyanate used in an amount equal to the sum of from 0.90 to 1.00 mol per mol of polyester plus the molar amount of diisocyanate equivalent to the mols of diamine used.

5. The process defined by claim 1 in which the elastomeric diisocyanate-modified linear polymer results from the reaction of a mixture comprising (A) a polyester prepared from at least one dibasic carboxylic acid containing at least three carbon atoms and at least one glycol, said polyester having a hydroxyl number from 40 to 100 and an acid number from 0 to 7, (B) a diamine used in an amount such that the total number of —$NH_2$ equivalents is from 0.06 to 0.48 equivalents per mol of polyester and (C) 4,4'-diphenyl diisocyanate used in an amount equal to the sum of from 0.90 to 0.99 mol per mol of polyester plus the molar amount of diisocyanate equivalent to the mols of diamine used.

6. The process defined by claim 1 in which the elastomeric diisocyanate-modified linear polymer results from the reaction of a mixture comprising (A) a polyester prepared from at least one dibasic carboxylic acid containing at least one glycol, said polyester having a hydroxyl number from 40 to 100 and an acid number from 0 to 7, (B) a diamine used in an amount such that the total number of —$NH_2$ equivalents shall be from 0.06 to 0.48 equivalents per mol of polyester and (C) 4,4'-tolidine diisocyanate used in an amount equal to the sum of from 0.90 to 0.99 mol per mol of polyester plus the molar amount of diisocyanate equivalent to the mols of diamine used.

References Cited in the file of this patent

UNITED STATES PATENTS

| | | |
|---|---|---|
| 2,625,532 | Seeger | Jan. 13, 1953 |
| 2,625,535 | Mastin et al. | Jan. 13, 1953 |
| 2,683,727 | Mastin et al. | July 13, 1954 |
| 2,683,728 | Mastin et al. | July 13, 1954 |
| 2,683,729 | Seeger et al. | July 13, 1954 |
| 2,698,845 | Mastin et al. | Jan. 4, 1955 |

OTHER REFERENCES

Pinner: Plastics (London), May 1947, pages 257–262.
Bayer: Modern Plastics, June 1947, pages 149, 151, 152, 250, 252, 254, 256, 258, 260.